United States Patent [19]

Sallas

[11] Patent Number: 4,637,002
[45] Date of Patent: Jan. 13, 1987

[54] SEISMIC SOURCE VIBRATOR HAVING SELF TUNING CONTROLLER

[75] Inventor: John J. Sallas, Plano, Tex.

[73] Assignee: Texas Instruments Incorporated, Dallas, Tex.

[21] Appl. No.: 586,156

[22] Filed: Mar. 5, 1984

[51] Int. Cl.⁴ ............................................. G01V 1/00
[52] U.S. Cl. .................................. 367/190; 181/401; 324/83 FE
[58] Field of Search ................ 367/190, 189; 181/121, 181/401; 324/83 FE; 364/149, 150, 151

[56] References Cited

PUBLICATIONS

Kalman et al., "New Results in Linear Filtering . . . ," Journal of Basic Engineering, 3/61, pp. 95–108.
Luenberger, D. C., "An Introduction to Observers," IEEE Transactions on Automatic Control, vol. Ac-16, #16, 12/71, pp. 596–602.

*Primary Examiner*—Nelson Moskowitz
*Assistant Examiner*—Ian J. Lobo
*Attorney, Agent, or Firm*—Thomas G. Devine; Leo N. Heiting; Melvin Sharp

[57] ABSTRACT

A self-tuning controller, for dynamic control of the servo valve and the actuator (mass, column, pad) of a seismic source vibrator, includes a state variable feedback network associated with a model reference for the servo valve and the actuator. The model references provide controllable states of the servo valve and actuator that would otherwise be inaccessible. The models run on-line and have the same inputs as the servo valve and the actuator. A Kalman filter provides a full order observer that compares accessible states between each model and the servo valve and actuator, and updates the model states in dependence on the difference.

24 Claims, 12 Drawing Figures

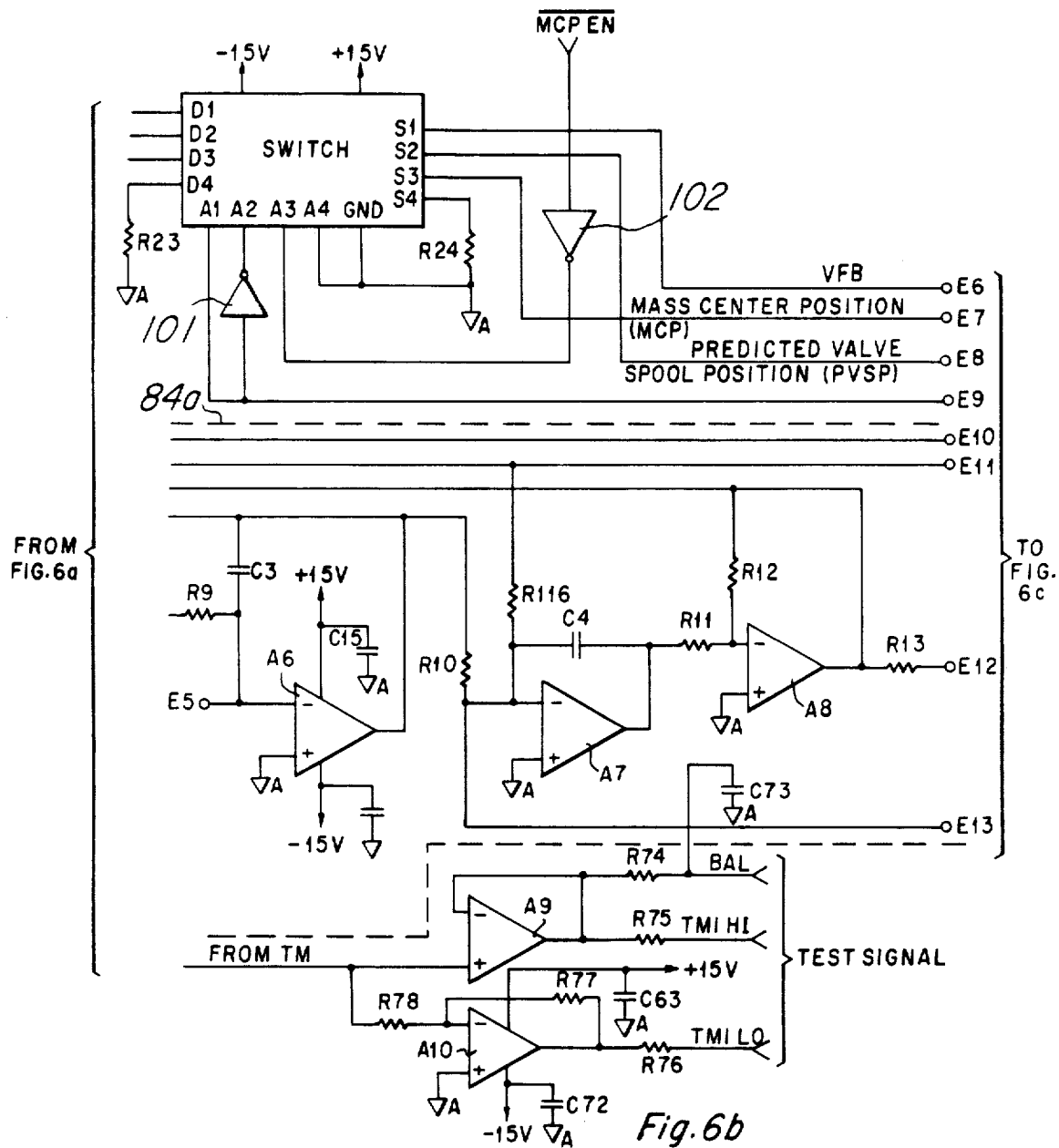

SEISMIC SOURCE VIBRATOR HAVING SELF TUNING CONTROLLER

BACKGROUND OF THE INVENTION

1. Field of the Invention

This invention deals with a self-tuning controller for a seismic source vibrator for controlling the output of the servo valve or the actuator through a feedback network, and more specifically, it describes a controller for dynamic control of the servo valve or the actuator, the controller including a state variable technique with inaccessible states controlled through a model with observers.

2. Description of the Prior Art

In prior art controllers, very little has been done to optimize the dynamic response of the servo valve or the actuator (mass, column, pad). In some systems, a series compensator (a lead-lag network) is inserted in the forward path of the servo valve control loop to control the dynamic response of the servo valve, but such systems rely on operator judgment to adjust a potentiometer to select an appropriate feedback level. Because servo valve dynamics are sensitive to the temperature of the hydraulic fluid, a feedback setting selected early in the morning may not produce the same vibrator dynamic response after several hours of operation. Changes in the dynamic response of the vibrator system may result in degraded performance of the vibrator.

Early systems also have not compensated for source generated distortion. For example, distortion may be due to the non-linear nature of the equations relating servo valve spool position, hydraulic flow and the pressure drop across the servo valve. A method of reducing unwanted distortion is to monitor the pressure being applied to the actuator and to use it as a feedback in a control loop. The actuator force is the force exerted by the hydraulic fluid upon the reaction mass and in an equal and opposite direction to the column. By reducing the distortion in the actuator force waveform, the energy imparted to the earth through the column and the earth coupled pad or marine transducers has less distortion.

Prior art systems have dealt with various feedback remedies for controlling the force waveform imparted to the earth. However, these prior art systems have not availed themselves of state variable feedback coupled with Kalman filter techniques, including observers, for instantaneous feedback response relating to the performance of the servo valve and the actuator.

BRIEF SUMMARY OF THE INVENTION

The state variable feedback of this invention provides a powerful control technique. In the fully observable system of this invention, all pole locations of the closed loop system are assigned as desired and the dynamic system response is chosen as desired.

In the disclosed system, an analogous model of the servo valve which has all states fully accessible is constructed. Likewise, an analogous model of the actuator which has all states fully accessible is also constructed. A single model of the servo valve—actuator combination may also be constructed. The models run on-line and have the same inputs as the actual servo valve and actuator. The states of the models provide estimates of the inaccessible states in the actual servo valve and actuator. The models may not correspond identically with the servo valve and actuator and therefore an observer technique is utilized to compare the accessible outputs of the models with their corresponding outputs in the actual servo valve and actuator. Observers approximately reconstruct missing state variable information necessary for control. The result of the comparison (difference) is used to update the model state estimates. The full order observer of this invention is implemented in a Kalman filter.

According to this invention, a servo valve model is connected across the servo valve. An actuator model is connected across the actuator. A Kalman gain network is connected to adjust the states of the servo valve model. Likewise, a Kalman gain network is connected to adjust the states of the actuator model. The adjusted states of each of the models, together with accessible states, are connected to respective state feedback networks for weighting of each of the states, summing those weighted values and comparing with the desired output signal for each of the servo valve and actuator. The differences are applied to the respective inputs to cause the estimated outputs to approach the desired outputs.

It should be noted that the feedback system including the observers and state variable networks, may be implemented in a digital computer.

The main object of this invention is to provide a self tuning controller for a seismic source vibrator that provides instantaneous, dynamic feedback control.

Another object of this invention is to provide a seismic source vibrator with instanteous feedback control of the servo valve.

Still another object of this invention is to provide a seismic source vibrator with instantaneous feedback control of the actuator.

An important object of this invention is to provide instantaneous feedback control for a seismic source vibrator of both the servo valve and the actuator.

These and other objects will be made evident in the detailed description that follows.

BRIEF DESCRIPTION OF THE DRAWINGS

FIGS. 6a, 6b and 6c, joined as shown, schematically illustrate Kalman gain 83a, servo valve model 84a, valve state feedback 85a, summer 86a, dither 87 and summer 89 of FIGS. 2 and 4.

DETAILED DESCRIPTION

This invention, as stated above, relates to self-tuning, state variable feedback control of seismic source vibrators. These vibrators may include both pressure wave and shear wave land vibrators, and marine vibrators. The feedback systems include models of the servo valve and actuator, and, alternatively, a model for the combination. The models are provided with observers to permit adjustment of inaccessible states of the devices being modeled. These states are continuously updated by a Kalman gain network. The reconstructed states, together with the accessible states, are input to a state variable feedback circuit which provides a weighted sum of these states. The sum is compared with the desired output and the difference or error signal is sent to the model and to the device being modeled.

Figure 1:
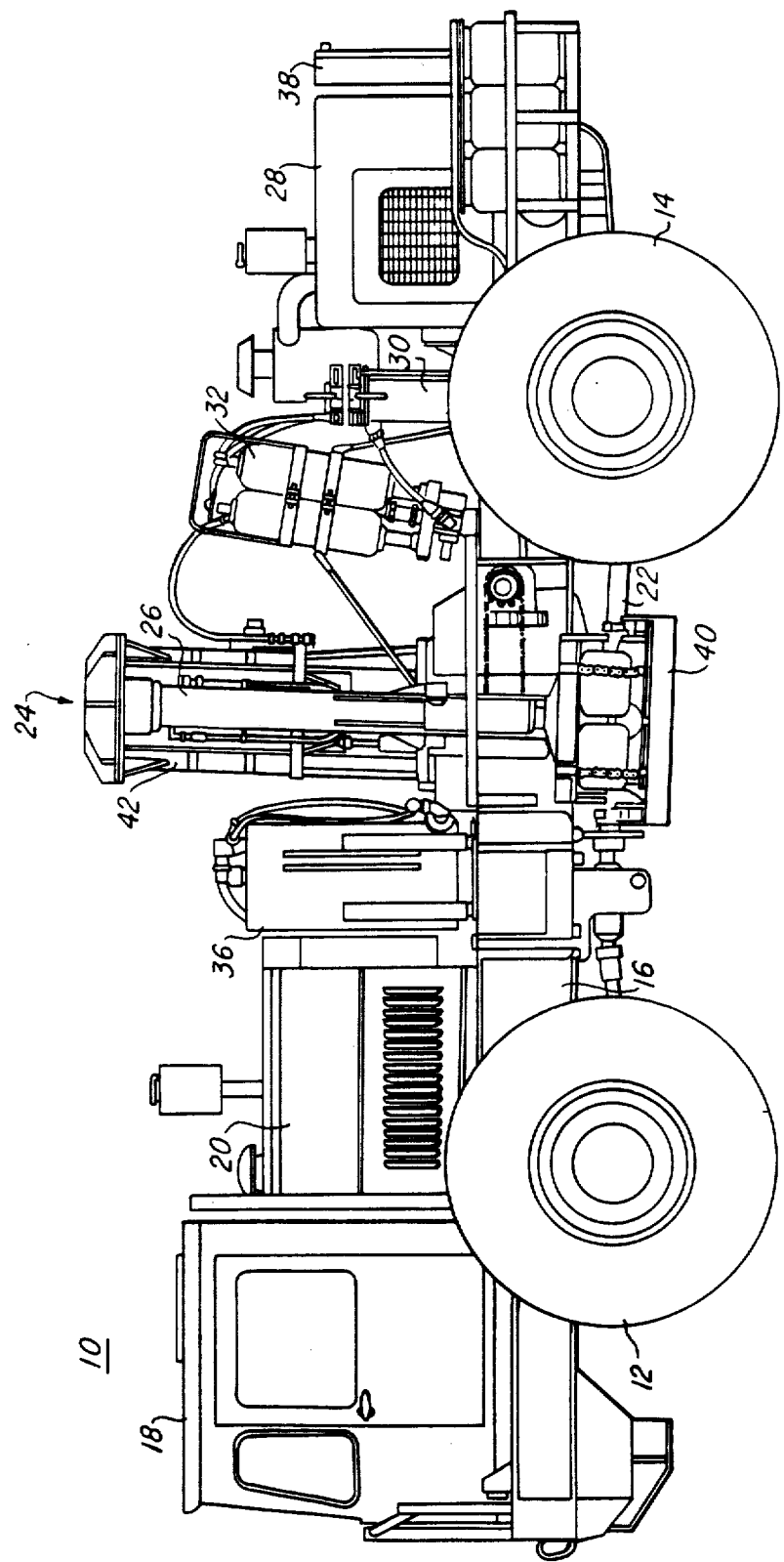
FIG. 1 is a side view of the seismic source vibrator mounted on a truck.

FIG. 1 illustrates a vehicle 10 having front and rear wheels 12 and 14, respectively, supporting a chassis comprised generally of frame member 16, a cab 18, and a conventional engine 20. The feedback circuit of this invention is primarily located within cab 18 and is not shown in FIG. 1. Vibrator assembly 24 is disposed between the front and rear wheels and connected to the frame member 16 of the truck by a lift system 26. A prime mover or engine 28, main hydraulic pump 30, high pressure accumulator system 32, hydraulic fluid tank 36, hydraulic tank cooler 38 and associated hydraulic plumbing is located on the frame member 16 as shown.

Figure 2:
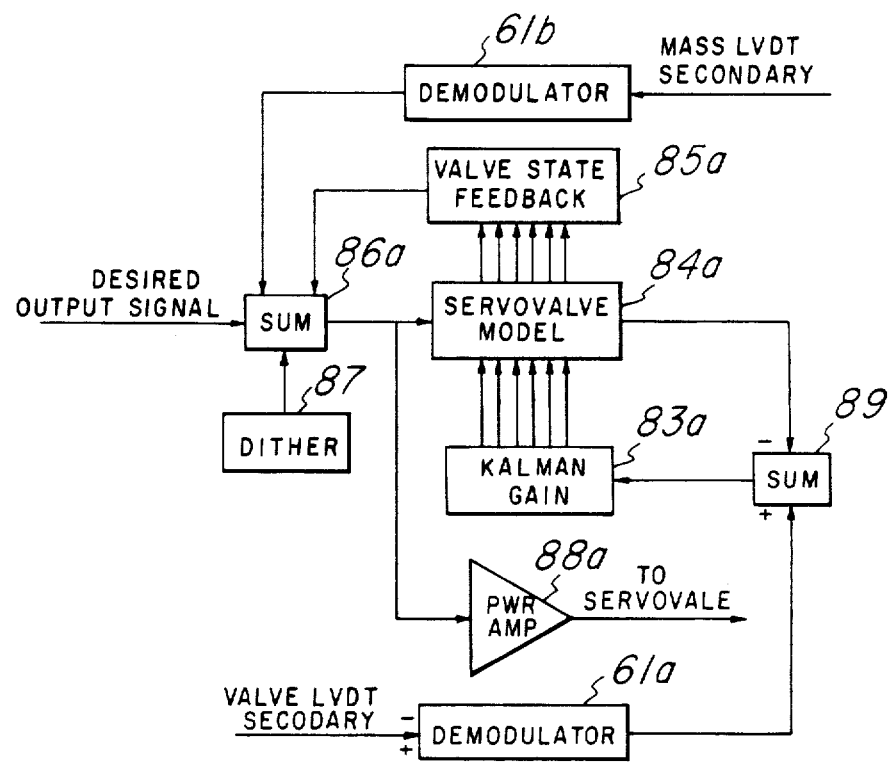
FIG. 2 is a block diagram illustrating state variable feedback for the servo valve.

FIG. 2 illustrates the state variable feedback system for the servo valve of the seismic vibrator source of this invention. In this preferred embodiment, an MOOG 76 DO79 style high frequency servo valve is employed in a Geophysical System, Inc. vibrator source type TR4/X2. These are design choices and, of course, the invention applies to other engineering selections. It should be noted, however, that other servo valves and other actuators would require different models, Kalman gains, state variable feedback, etc.

A signal from linear-variable differential transducer 52, mounted on servo valve 51, (see FIG. 5) provides an input to demodulator 61a. This input is indicative of the spool position of servo valve 51. The signal desired at the output of the servo valve 51 is specified as "desired output signal" and provides an input to summer 86a. Dither 87 also provides an input to summer 86a. Dither 87 is shown in schematic detail in FIG. 6a, but is not relative to this invention. Dither 87 provides a sine wave at approximately 600 Hz which is sent to servo valve 51 only when there is no sweep signal being applied, and which is intended to prevent the servo valve from building up any contamination.

Another input is from linear-differential transducer 55 (FIG. 5) which provides a signal to demodulator 61b which in turn provides an input to summer 86a. This particular input is typically used in Geophysical Systems, Inc. seismic vibrator source systems, but is not part of this invention.

Servo valve model 84a simulates servo valve 51. The derivation of the model is known in the prior art and is accomplished by writing force-balance equations on the various parts of the servo valve 51. These equations are then combined into one differential equation.

An alternative method of derivation involves measuring all measurable parameters of servo valve 51 and from these parameters, one skilled in the art may directly write the Laplace transform for the system.

In either of the above cases, however, it should be noted that the model derived therefrom is linear and the servo valve is non-linear. For that reason, the Kalman gain network is necessary.

In this preferred embodiment, the Laplace transform for servo valve model 84a is represented by:

$$\frac{K(W1)^2(W2)^2 \cdot W3}{S(S^2 + 2 \cdot Z1 \cdot W1 \cdot S + W1^2)(S^2 + 2 \cdot Z2 \cdot W2 \cdot S + W2^2)(S + W3)}$$

where:
W1 = 470 × 2 pi radians/sec.
W2 = 750 × 2 pi radians/sec
W3 = 400 × 2 pi radians/sec.
Z1 = 0.08
Z2 = 0.40
S = Laplace transform operator
K = constant The output from servo valve model 84a is summed in summer 89 with the output from servo valve 51 in the form of a signal from demodulator 61a. The difference is applied to Kalman gain 83a. The Kalman gain 83a, together with servo valve model 84a form a Kalman filter. This filter is designed through the study of sources of measurement noise. Then the filter parameters (pole locations) are chosen to obtain optimum noise avoidance. By setting the Kalman gains, the dynamic response of the Kalman filter is determined, i.e., how quickly the state estimates converge. For a detailed understanding of the Kalman filter technique, see "New Results in Linear Filtering and Prediction Theory" J. BASIC ENG., TRANS. ASME, Ser. D, 83, pp. 95–108, by R. E. Kalman and R. S. Bucy (1961), incorporated herein by reference.

The servo valve observer is comprised of Kalman gain 83a, the servo valve model 84a with adjustable states and summer 89. As indicated above, all of the states of the servo valve 51 are not accessible. In this preferred embodiment, only the input and output are accessible and therefore all of the other states are inaccessible. the states are fully accessible with respect to servo valve model 84a and are changed by Kalman gain 83a using the observer technique. An observer compares the accessible outputs of the real system with their corresponding model estimates. The difference between actual and predicted value are used to update the model state estimates. That is, the Kalman gain 83a updates the states of model 84a. These states are subjected to appropriate gains to set the frequencies of the poles of the following transfer function:

$$\frac{1.536 \cdot 10^3(S^5 + 4.244 \cdot 10^4 S^4 + 1.134 \cdot 10^8 \cdot S^3 + 1.175 \cdot 10^{12} S^2 + 1.006 \cdot 10^{15} S + 6.1432 \cdot 10^{18})}{S^6 + 4.87 \cdot 10^3 \cdot S^5 + 9.894 \cdot 10^7 \cdot S^4 + 2.352 \cdot 10^{11} \cdot S^3 + 2.008 \cdot 10^{15} \cdot S^2 + 1.74 \cdot 10^{18} \cdot S + 9.434 \cdot 10^{21}}$$

The new states are summed and sent to summer 86a where they are combined with the desired output signal. The difference output from summer 86a provides an input to servo valve model 84a and also to power amplifier 88a so that both servo model 84a and the servo valve 51 are provided with an updated input. The combination of Kalman gain 83a and servo valve model 84a allows the servo valve model 84a output to approach the actual output of servo valve 51. For a more detailed understanding of the observer theory, see "An Introduction to Observers", IEEE TRANS., v A. C. 16, No. 6, pp. 596–602 by D. G. Luenberger (1971), incorporated herein by reference.

Figure 3:
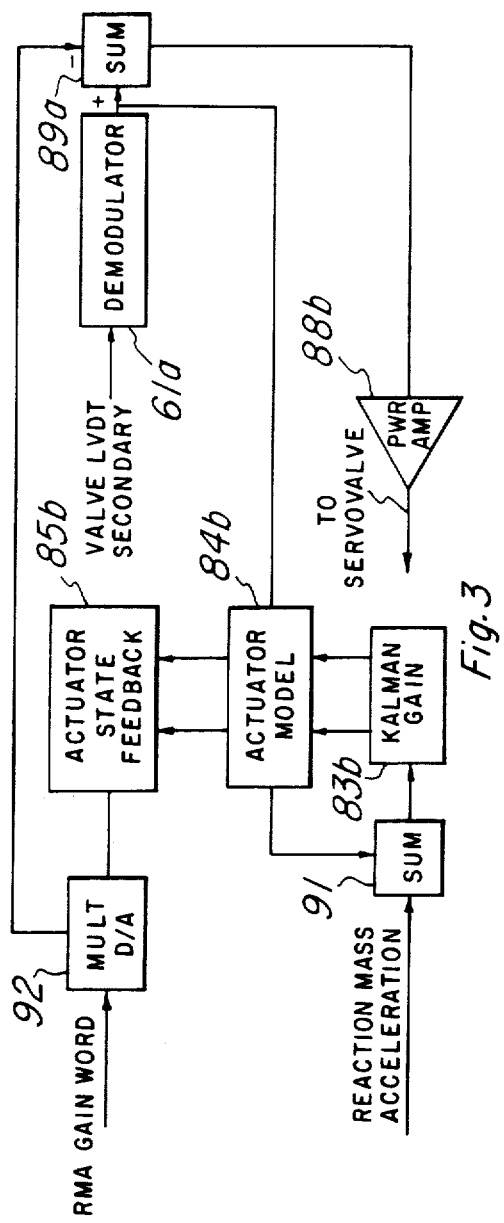
FIG. 3 is a block diagram illustrating state variable feedback for the actuator.

FIG. 3 illustrates the actuator feedback, with the demodulator 61a providing a representation of the spool position of servo valve 51. Another input is provided as a reaction mass acceleration, coming from accelerometer 56 (FIG. 5) mounted on pad 40. Of course, the actuator force may be measured directly by means of pressure transducers which are in communication with the interior of the actuator. In this preferred embodiment, an accelerometer mounted on the reaction mass generates the signal (RMA) which provides a good approximation of the actual actuator force. The RMA signal is applied to summer 91 which inputs Kalman gain 83b. Kalman gain 83b adjusts the states of actuator model 84b in the same manner that Kalman gain 83a adjusts the states of servo valve model 84a. The output of actuator model 84b is summed with the RMA signal to provide an error signal to Kalman gain 83b. The net result is to cause the actuator model output to approach the RMA. The adjusted gains of actuator model 84b are gain adjusted by actuator state feedback 85b in the same manner as the valve state feedback 85a mentioned above. The output from actuator state feedback 85b is summed with the output from demodulator 61a and summer 89a, providing an error signal which is used as an input to the actuator model 84b and to the servo valve through power amplifier 88b. Multiplying D/A 92 provides a D/A conversion and a gain as desired. The circuitry is set out in detail and will be discussed later, but is not germaine to this invention.

Actuator model 84b having input valve position and output actuator force, is represented by the following transfer function:

$$\frac{K \cdot S}{S^2 + 2 \cdot Z1 \cdot W1 \cdot S + W1^2}$$

wherein:
W1 = 22 × 2 pi radians/sec.
Z1 = 0.20
S = Laplace transform operator
K = constant The observer for the actuator model 84b with actuator Kalman gain 83b is represented by the following transfer function:

$$\frac{4.33 \cdot 10^4 S}{S^2 + 4.34 \cdot 10^4 S + 1.70 \cdot 10^4}$$

Figure 4:
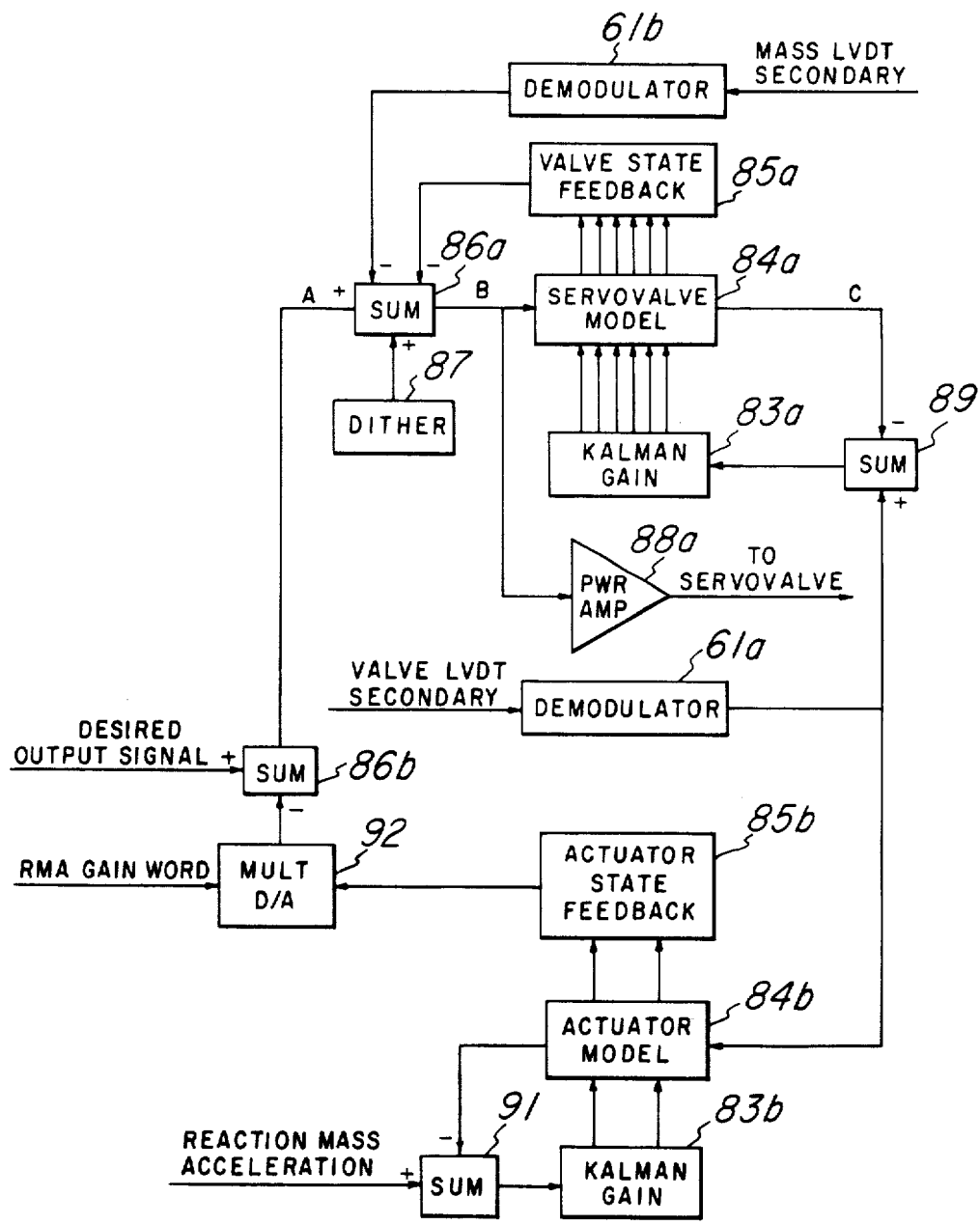
FIG. 4 is a block diagram illustrating state variable feedback for the combination of the servo valve and the actuator.

FIG. 4 is a block diagram illustrating state feedback for both the servo valve 51 and the actuator. In this embodiment, the output from actuator state feedback 85b provides an input to summer 86b to provide a difference output therefrom to summer 86a. Therefore, the difference between the separate embodiments of FIGS. 2 and 3, and the circuit of FIG. 4 is simply adding the output from the actuator feedback to the servo valve feedback.

Figure 5:
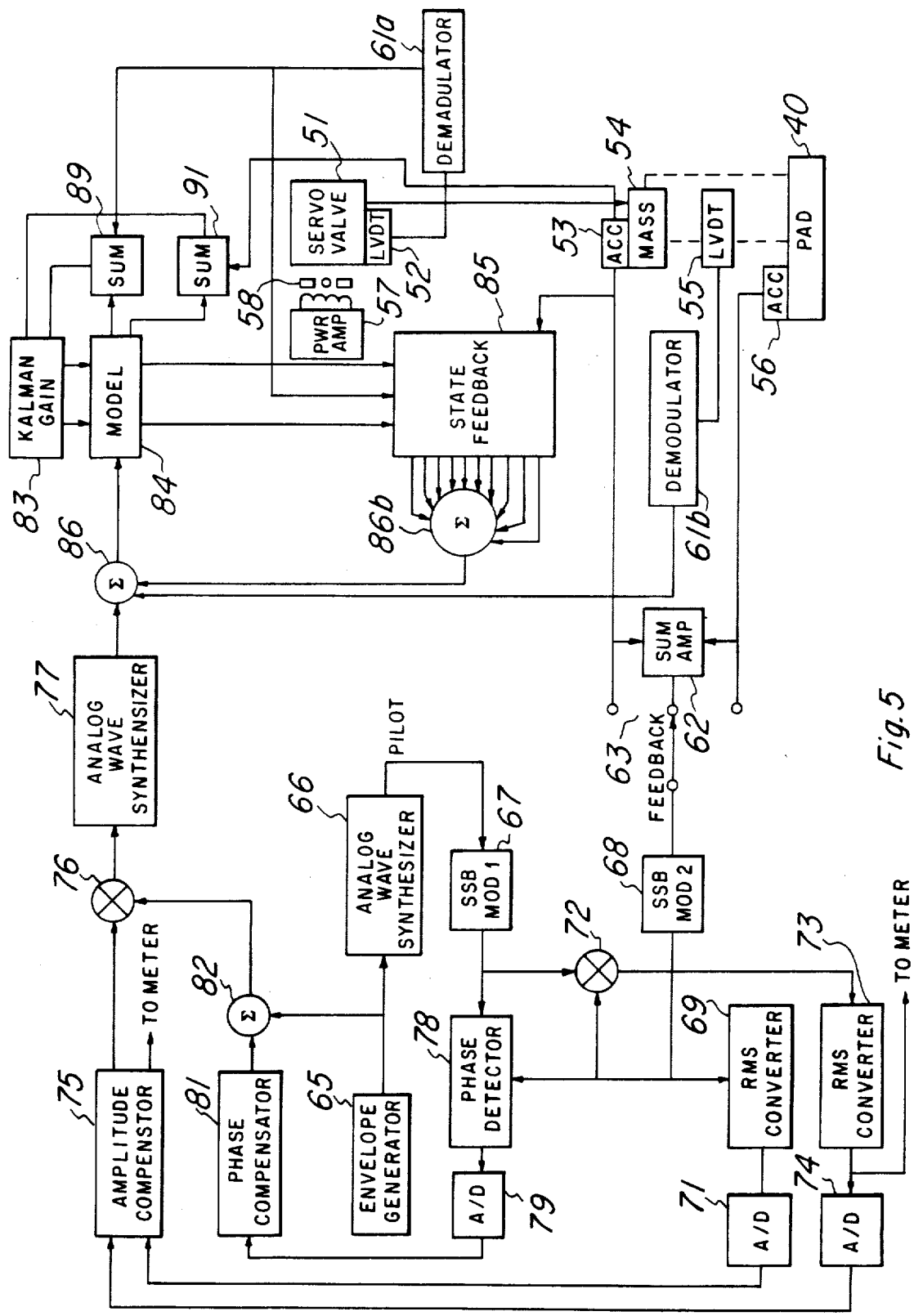
FIG. 5 is a block diagram illustrating the overall feedback of the seismic source vibrator including the state variable feedback.

Still another embodiment, illustrated in FIG. 5, is one where the servo valve and the actuator are taken in combination as one unit. That is, a single model simulates both the servo valve and the actuator, adjusted by a single Kalman gain network and finally adjusted by a single state feedback network. As shown in FIG. 5, this is accomplished through model 84, Kalman gain 83 and state feedback 85.

The overall gain of the state variable feedback system is represented by the following transfer function (for an RMA gain word of 0.5):

$$\frac{K \cdot S}{S^8 + 1.74 \cdot 10^4 \cdot S^7 + 1.27 \cdot 10^8 \cdot S^6 + 4.981 \cdot 10^{11} \cdot S^5 + 1.161 \cdot 10^{15} \cdot S^4 + 1.558 \cdot 10^{18} \cdot S^3 + 1.13 \cdot 10^{21} \cdot S^2 + 1.690 \cdot 10^{23} \cdot S + 1.951 \cdot 10^{23}}$$

From this function, the values of resistors in the state variable feedback networks can be determined.

FIG. 5 illustrates the combination of power amplifier 57, mass 54, pad 40, and linear variable-differential transducer 52 and 55. This combination is in the prior art as described in U.S. Pat. No. 3,929,206, entitled "Servo Hydraulic Transducer and Method of Operation" assigned to the assignee of this invention and incorporated herein by reference. These units are combined with the state feedback components as shown to provide a new combination. This new combination illustrates accelerometer 56 connected to pad 40 and having an output connected to the input of summing amplifier 62. Linear variable differential transducer 55 is shown having an output to the input of demodulator 61b where the demodulated output is provided to summer 86a. Summer 86 receives an input from analog wave synethsizer 77 (desired output signal) and also from demodulator 61b. Model 84 receives the output of summer 86, as well as the outputs from Kalman gain 83. Model 84 provides inputs to state feedback 85 which also receives the output from accelerometer 53 and demodulator 61a, representing the demodulated output from LVDT 52. The output from state feedback 85 provides weighted inputs to summer 86b which in turn provides an input to summer 86a. The difference is provided through model 84. Model 84 provides outputs to summers 89 and 91 which provides difference inputs to Kalman gain 83. As can be seen, this circuitry is simply a consolidation of the circuitry of FIG. 4.

The remainder of the block diagram of FIG. 5 deals with an overall feedback system. This overall feedback system is not part of this invention and shall not be described herein. The system is the subject of U.S. patent application Ser. No. 435,124, filed 10/18/82 for "Vibrator Seismic Source Having Distortion Limiting Control System", assigned to the assignee of this invention.

Figure 6A:
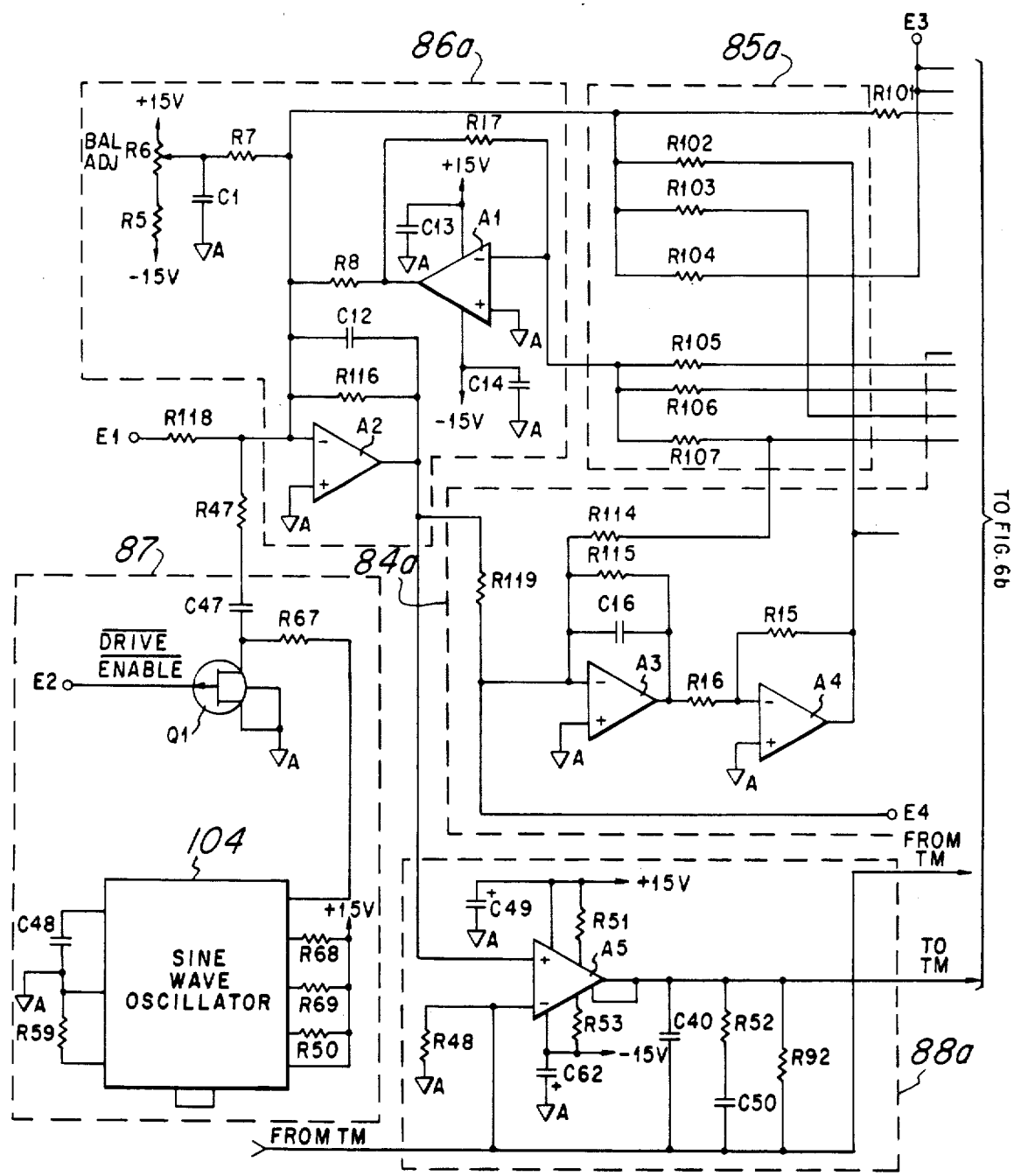
Figure 6C:
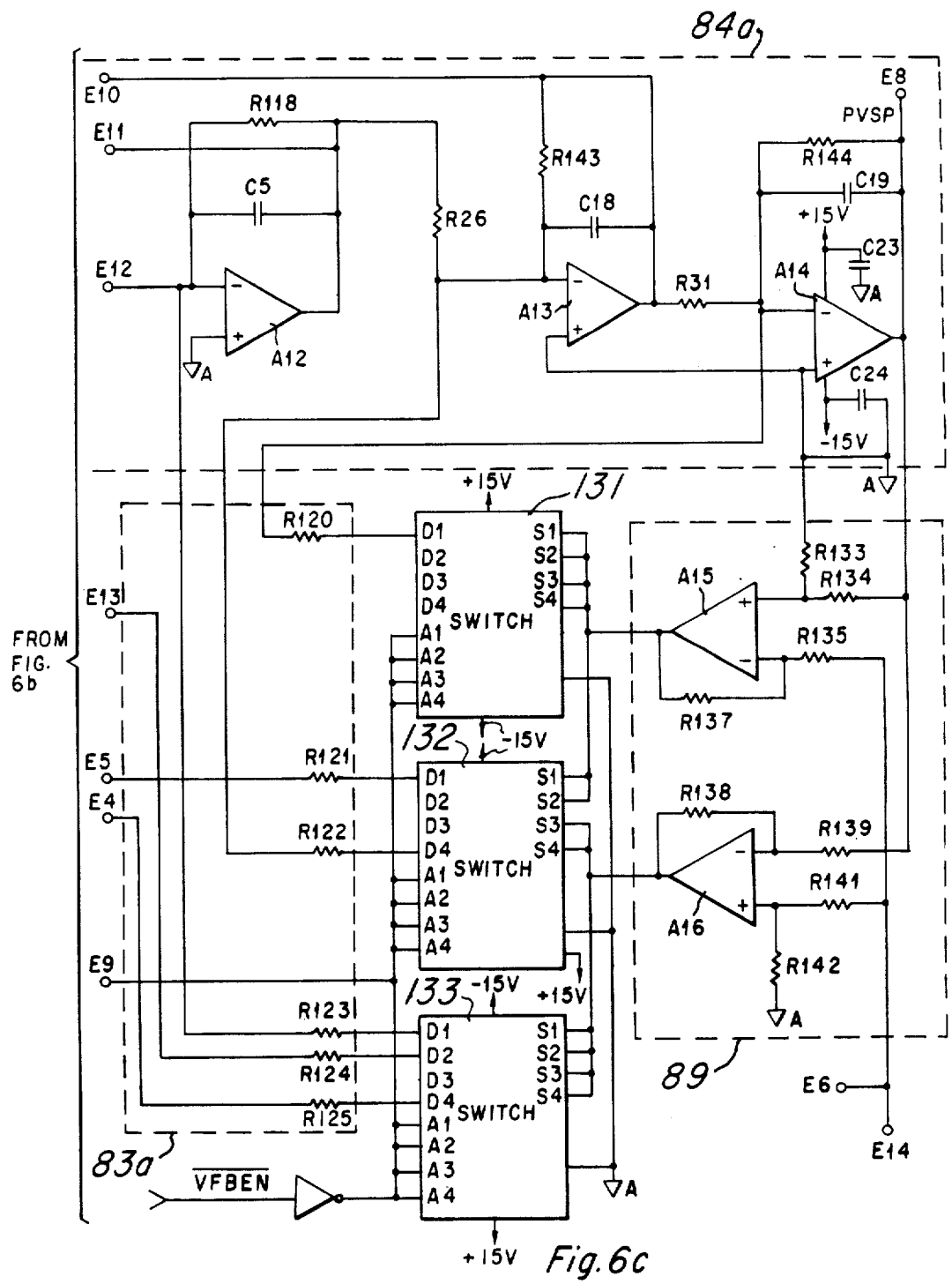

Please refer now to FIGS. 6a, 6b and 6c assembled as indicated. Specifically with reference to FIG. 6a, refer to valve state feedback 85a. Resistors R102–R104 are connected, at one end to the inverting input of operational amplifier A2. Resistors R105-1078 are tied together at one end and connected to the inverting input of operational amplifier A1. Operational amplifiers (op-amp) A1 and A2 are used in summer 86a. The values assigned to these resistors to achieve the desired poles of the valve state feedback transfer function are:
- R102 = 86.60K ohm
- R103 = 20.50K ohm
- R104 = 1.18K ohm
- R105 = 1.78K ohm
- R106 = 2.10K ohm
- R107 = 22.60K ohm The inputs to valve state feedback are the otherwise inaccessible states, together with the accessible states. The inaccessible states come from servo valve model 84a. Servo valve model 84a has an input applied through resistor R119 to the inverting input of op amp A3 whose noninverting input is grounded. The output of op amp A3 is applied through resistor R16 to the inverting input of op amp A4 whose noninverting input is grounded. The output of op amp A3 is also fed back to its inverting input through capacitor C16 and resistor R115. Also, the other end of resistor R107 of valve state feedback 85a is connected through resistor R114 to the inverting input of op amp A3. The output of op amp A4 is fed back to its inverting input through resistor R15 and also is applied to the other end of resistor R102 in valve state feedback 85a. The output of op amp A4 is also applied, through resistor R9, to the inverting input of op amp A6, in FIG. 6b. The output of op amp A6 is applied, through resistor R10 to the inverting input of op amp A7 whose noninverting input is grounded. The output of op amp A7 is fed back to its inverting input through capacitor C4. The inverting input of op amp A7 is connected through resistor R116 to the other side of resistor R106 in valve state feedback 85a. The output of op amp A7 is applied, through resistor R11, to the inverting input of op amp A8 whose noninverting input is grounded. The output of op amp A8 is connected to its inverting input through resistor R12 and is also connected to the other end of resistor R103 in valve state feedback 85a.

The output from op amp A8 is applied, through resistor R13, to the inverting input of op amp A12 whose noninverting input is grounded. The output of op amp A12 is connected to its input through the parallel combination of capacitor C5 and resistor R118. It is also connected to the other end of resistor R106 of valve state feedback 85a. The output from op amp A12 provides an input, through resistor R26, to the inverting input of op amp A13 whose noninverting input is grounded. The output from op amp A13 is fed back to its inverting input through the parallel combination of capacitor C18 and resistor R143 and also is connected to the other end of resistor R105 of valve state feedback 85a.

The output of op amp A13 is connected through resistor R31 to the inverting input of op amp A14 and also to one end of resistor R120 of Kalman gain 83a. The noninverting input of op amp A14 is connected to ground and its output is connected to its inverting input through the parallel combination of capacitor C19 and resistor R144. Its output is the predicted valve spool position (PVSP) which is applied to terminal S2 of switch 103. This signal, the output from the servo valve model 84a, is the estimated output signal that is applied to switch 103 for testing purposes only. Signal PVSP is also applied through resistors R134 and R139, respectively, to the noninverting input of op amp A15 and to the inverting input of op amp A16, respectively, both of these op amps being components of summer 89.

In summary, with respect to valve state feedback 85a and servo valve model 84a, op amp A4 supplies resistor R102; op amp A6 supplies resistor R107; op amp A8 supplies resistor R103; op amp A12 supplies resistor R106; op amp A13 supplies resistor R105; signal VFB supplies resistor R104.

Referring to FIG. 6a, summer 86a has an input from summer 86b on terminal E1, applied through resistor R118 to the inverting input of op amp A2 whose noninverting input is grounded. The output of op amp 82 is fed back to its inverting input through the parallel combination of capacitor C12 and resistor R116. Op amp A1 has its output connected to its inverting input through resistor R17. The output of op amp A1 is connected through resistor R8 to the inverting input of op amp A2 and also to a balance adjust voltage network comprised of resistors R4, R5 and R6 connected in series between +15 volts and −15 volts with R6 in the center supplying a variable voltage through resistor R7. Capacitor C1 is connected between resistors R6 and R7 and ground. It is therefore evident that signals from resistors R105–R107 which are applied to the inverting input of op amp A1 are inverted twice, while the inputs from resistors R102–R104, which are applied to the input of op amp A2, are inverted only once. These inversions are dependent upon the particular states from the model 84a.

The output from summer 86A is applied to servo valve model 84a, as indicated above. It also is applied to the noninverting input of op amp A5 whose inverting input is connected through resistor R48 to ground and also connected to receive a signal from the torque motor of the servo valve which is the first stage of that valve. Op amp A5 is a stage in power amplifier 88a which provides an input to the servo valve 51. Op amp 84a has its output connected to the torque motor of the servo valve. That output is also connected through parallel paths to the line from the torque motor, the parallel pads being capacitor C40 as one parallel path, the series combination of resistor R52 and capacitor C50 as another parallel path and the third parallel path.

Dither 87 is shown in FIG. 6a as being made up of sine wave oscillator 104 whose output is applied to summer 86a, and ultimately to power amplifier 88a, when transistor Q1 is turned on by the signal DRIVE ENABLE-.

FIG. 6c illustrates Kalman gain 83a with the other end of resistor R120 connected to an input to terminal D1 of switch 131. Resistor R121 is connected at one end to terminal E5 and at the other end to terminal D1 of switch 132. Resistor R122 is connected at one end to the inverting input of op amp A13 (the effective output from op amp A12) and at the other end to input terminal D4 of switch 132. Resistor R123 is connected at one end to terminal E12 and at the other end to terminal D1 of switch 133. Resistor R124 is connected at one end to terminal E13 and at the other end to terminal D2 of switch 133. Resistor R125 is connected at one end to terminal E4 and at the other end to terminal D4 of switch 133.

In this preferred embodiment, these resistor values are:
 R120=196.00K ohms
 R121=2.10K ohms
 R122=4.87K ohms
 R123=29.40K ohms
 R124=1.87K ohms
 R125=40.20K ohms The differential output from summer 89 is provided to Kalman gain 83a through switches 131-133. Resistors R120–R125 ultimately are applied to the various states of servo valve model 84a. Resistor R120 is applied to the inverting input of op amp A14. Resistor 121 is applied to the inverting input of op amp A6. Resistor 122 is applied to the inverting input of op amp A13. Resistor 123 is applied to the inverting input of op amp A12. Resistor 124 is applied to the inverting input of op amp A7. Resistor 125 is applied to the inverting input of op amp A3. With the values of resistance given, the gains of servo valve model 84a are adjusted to cause the estimated output from servo valve model 84a to approach the output from servo valve 51 in instantaneous amplitude.

Summer 89 receives its inputs from op amp A14 as noted earlier and also receive signal VFB (vibrator feedback), the output from demodulator 61a applied through resistor R135 to the inverting input of op amp A15 and through resistor 141 to the non-inverting input of op amp A16. Op amp A15 has its output connected through resistor R137 to its inverting input. Op amp A16 has its output connected to its inverting input thorugh resistor R138. The output of op amp A15 is connected to input terminals of switches 131 and 132. Op amp A16 has its output connected to input terminals of switches 132 and 133. The switches are connected so that the outputs are connected to the appropriate resistors discussed above.

Figure 7A:
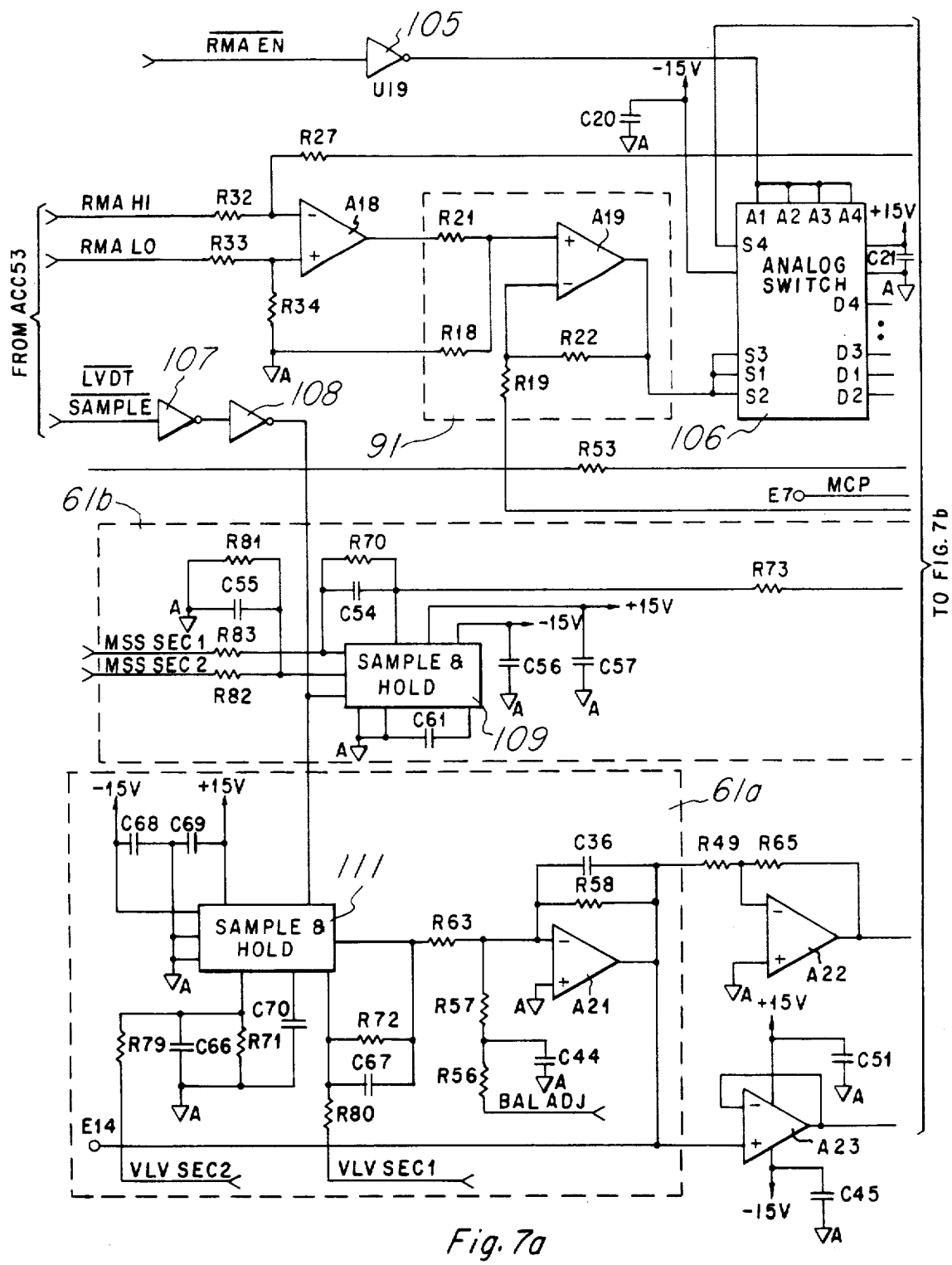
FIGS. 7a and 7b, connected as shown, schematically illustrate demodulators 61a and 61b, actuator model 84b, actuator state feedback 85b, Kalman gain 83b and summer 91.
Figure 7B:
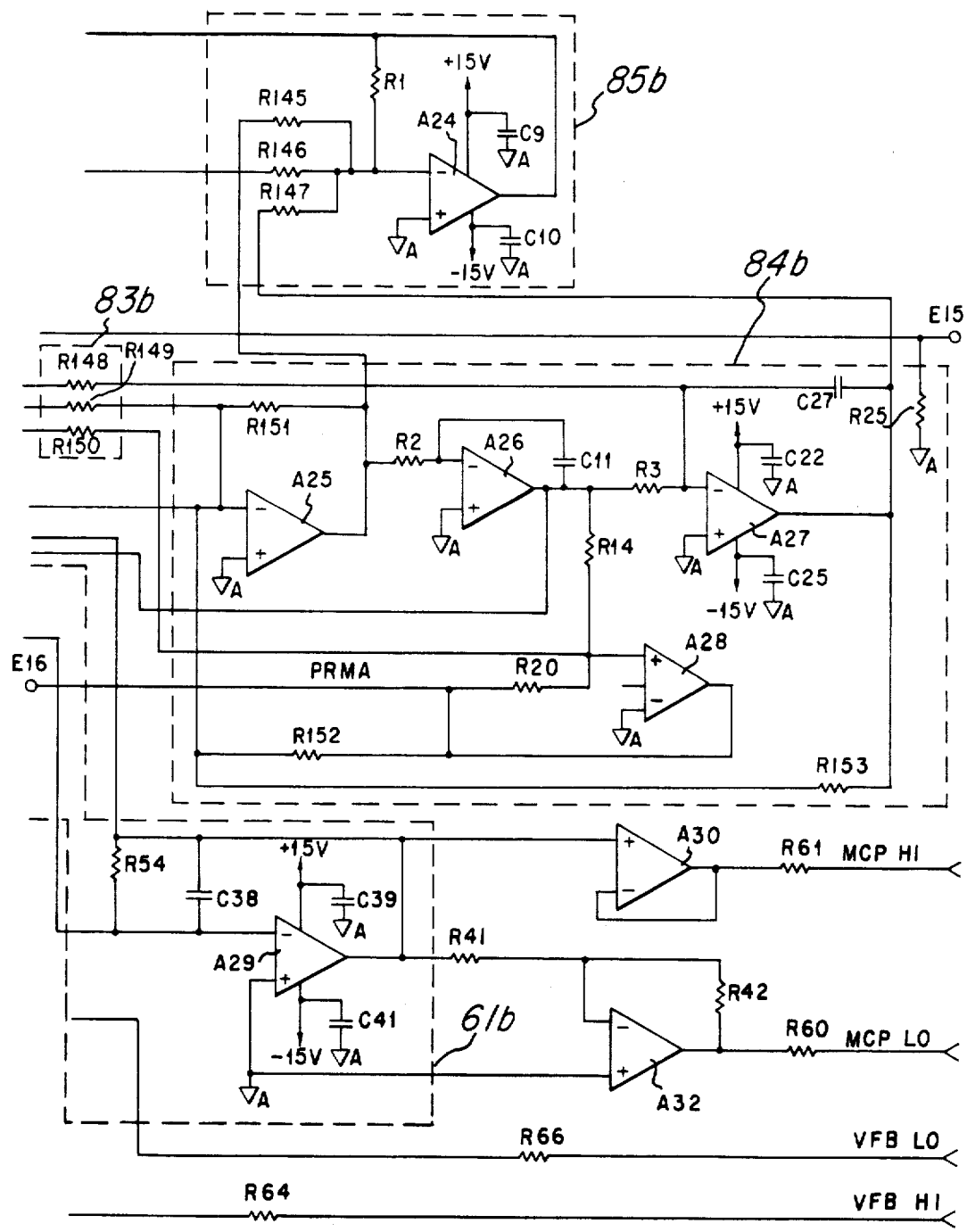

Demodulator 61b is shown in FIGS. 7a and 7b. As stated earlier, the output from demodulator 61b, namely a signal indicating the position of the mass with respect to centering, is not germaine to this invention and therefore the demodulator 61b will not be described in detail. The differential output from accelerometer 53 is shown as signals RMA high and RMA low applied through resistors R32 and R33 to the inverting input and non-inverting input respectively of op amp A18. The non-inverting input of op-amp A18 is connected through resistor R34 to ground. Its output is connected through resistor R27 to its non-inverting input. The output from op amp A18 is also connected through resistor R21 to the non-inverting input of op amp A19 of summer 91. The non-inverting input of op amp A19 is connected through resistor R18 to ground and its output is connected to the input terminal of analog switch 106, and through resistor R22 to its inverting input.

The output from analog switch 106 provides an input to summer 91 to Kalman gain 83b through the parallel combination of resistors R148, R149 and R150. In this preferred embodiment, the values of these resistors are:
R148 = infinity
R149 = 3.92K ohms
R150 = infinity Thus, in this Kalman gain 83b, only the accessible state is utilized because of the particular parameters existent.

The output from Kalman gain 83b is applied to the input of actuator model 84B in FIG. 7b. The one end of resistor R149 is connected to the inverting input of op amp A25 whose non-inverting input is grounded and whose output is connected through resistor R151 to its inverting input. Its output is also connected, through resistor R2, to the inverting input of op amp A26 whose output is connected through capacitor C11 to its inverting input. The non-inverting input of op amp A26 is connected to ground. The output from op amp A26 provides signal PRMA, for testing, and also is connected, through resistor R3, to the inverting input of op amp A27 whose non-inverting input is connected to ground. The output of op amp A27 is connected through capacitor C27 to its inverting input and is also connected, through resistor R147 of actuator state feedback 85b to op amp A24. The output from op amp A27 is also connected through resistor R153 to the inverting input of op amp A27. Op amp A28 has its inverting input connected to the output of op amp A26 through resistor R14 and has its non-inverting input grounded. Its output is connected to its inverting input through resistor R20 and is also connected through resistor R152 to the inverting input of op amp A25.

Actuator state feedback 85b is shown having resistors R145, R146 and R147 as inputs. In this preferred embodiment, the values of those resistors are:
R145 = infinity
R146 = 7.87K ohms
R147 = infinity The variable state feedback for the actuator is seen to require only the accessible input through resistor R146, which comes ultimately from accelerometer 53. R146 applies the input to the inverting input of op amp A24 whose non-inverting input is grounded. The output of op am A24 is connected through resistor R1 to the inverting input and is also connected, through resistor R27, to the inverting input of A18, summing with the input from accelerometer 53.

Figure 8A:
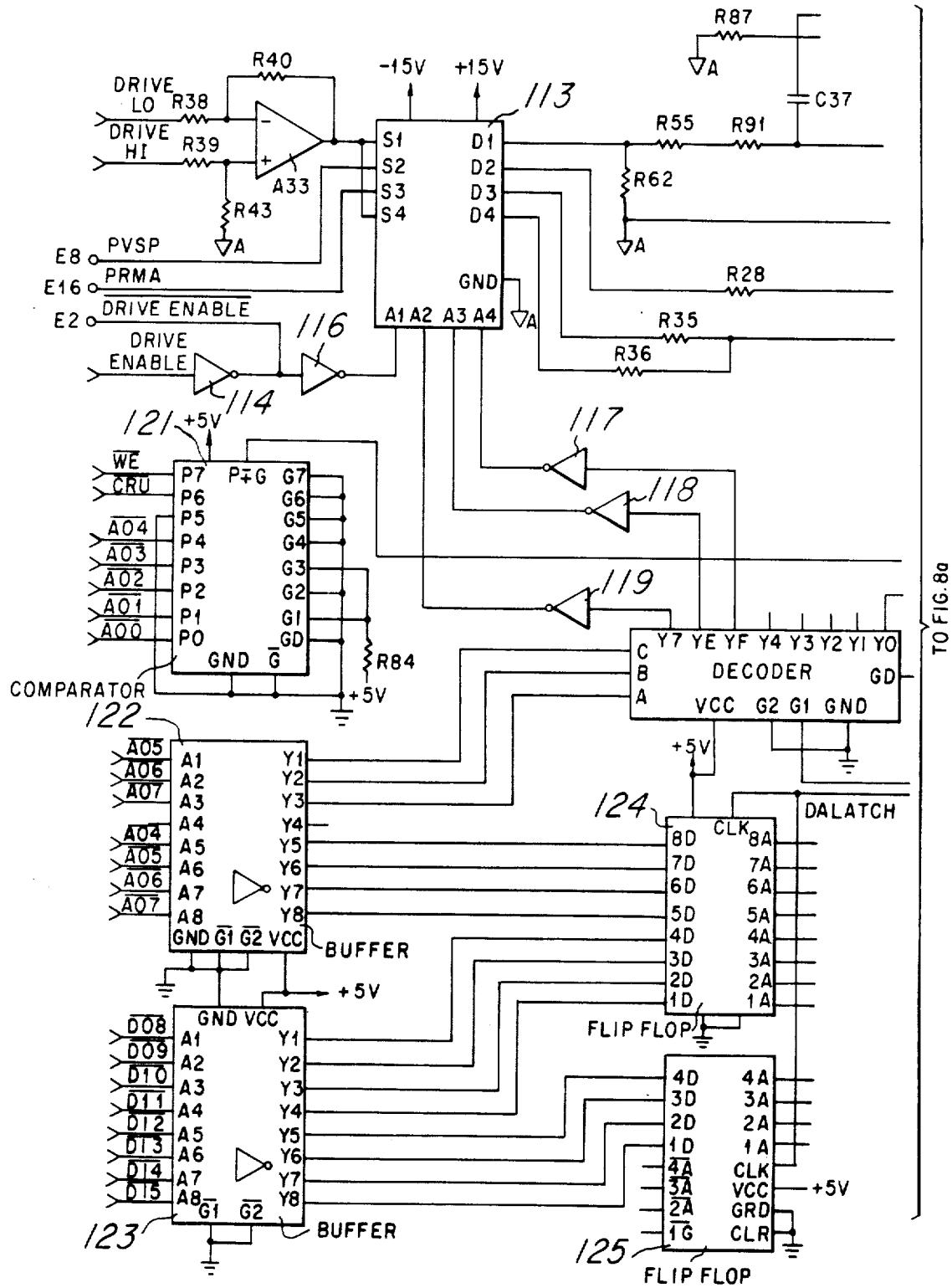
FIGS. 8a and 8b, connected a shown, schematically illustrate decoding circuitry, summer 86b and multiplying D/A 92 of FIG. 4.
Figure 8B:
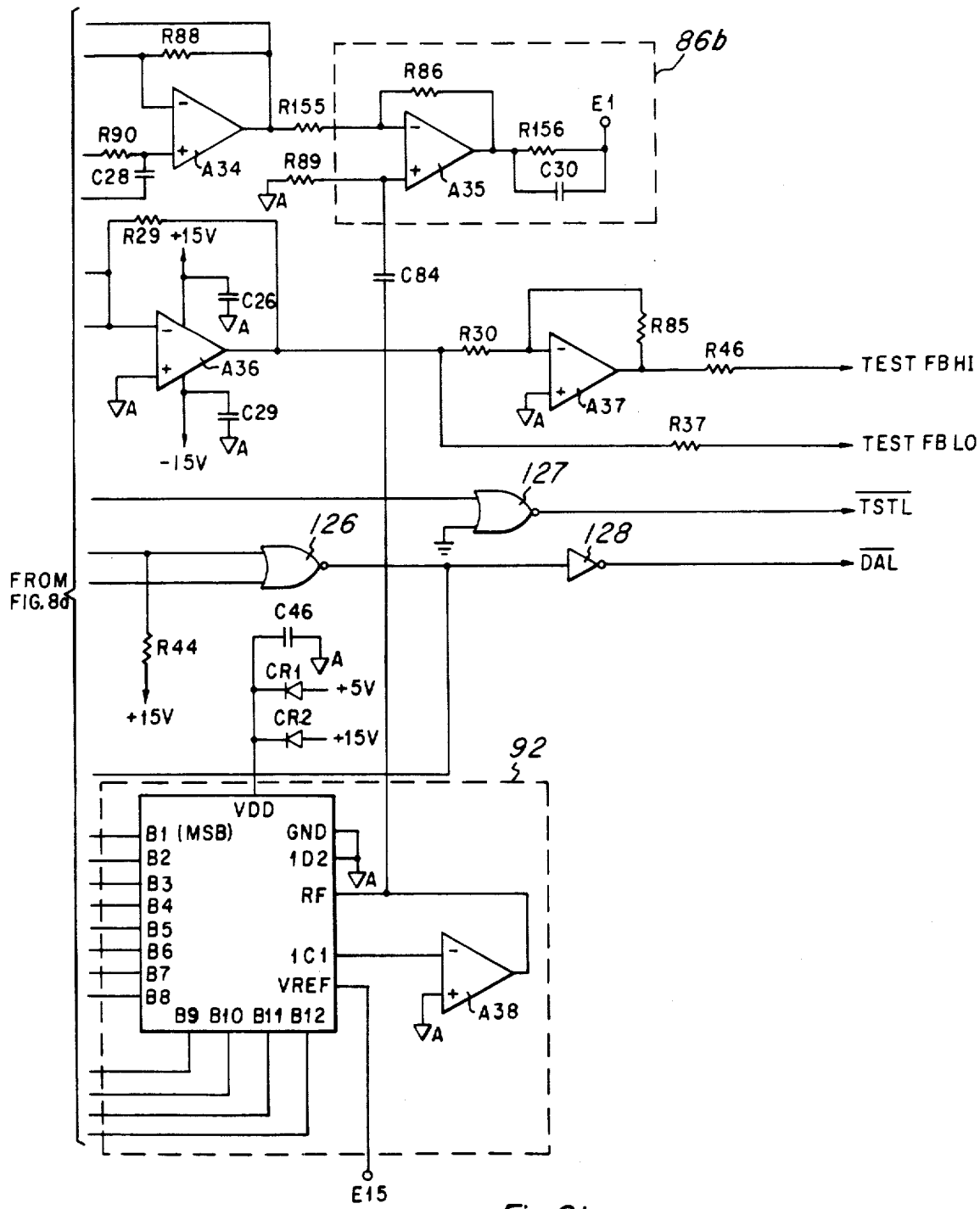

In FIG. 7b, op amps A30 and A32 are shown as outputs from demodulator 61b. They serve as buffers for test signals. FIG. 8a illustrates decode logic with inputs to buffers 122 and 123 and comparator 121. This decode logic is for selecting the RMA gain word that is applied to multiplying D/A converter 92. A level word is a function of frequency as follows:

0.5 level for frequencies less than 50 Hz
Level 0.01×(100 minus frequency) for frequencies above 50 and below 100
Level 0.0 for frequencies above 100 Hz As indicated earlier, this RMA gain word is not important to this invention and need not be discussed further.

FIG. 8a also illustrates the desired output signal provided to op amp A33 in the form of differential signals. The output of op amp A33 provides inputs to a test switch 113 that has other test signals applied and is not of importance to this invention.

Of importance, however, is the desired output signal from switch 113 which is applied through resistors R55, R91 and R90 to the non-inverting input of op amp A34. The output of op amp A34 is connected to its inverting input through resistor R88 and is also connected, through capacitor C37 to the junction of resistors R91 and R90. The inverting input of op amp A34 is connected through resistor R87 to ground. The output from op amp A34 is applied through resistor R155 to the inverting input of op amp A35 in summer 86b. The non-inverting input of op amp A35 receives an output from op amp A38, the final stage in multiplying D/A converter 92. The output from op amp A35 is connected to its inverting input through resistor R86 and also through resistor R156 to terminal E1 which is one input to summer 86a.

MODE OF OPERATION

Referring first to FIG. 1, the vehicle is moved to the desired location where prospecting is to be done. For marine vibrator operation, the boat is moved into the desired position. The pad 4c of FIG. 1 is lowered into contact with the earth and the seismic vibrator source is turned on. A pair of cleated pads would be moved into grasping contact with the earth in the case of the shear wave vibrator.

Referring to FIGS. 4 and 5, the desired output signal is generated by analog wave synthesizer 77, the spool position of servo valve 51 is indicated by LVDT 52 and the actuator force is indicated by accelerometer 53. The output from LVDT 52 is demodulated by demodulator 61a and applied to summer 89 where it is compared with the output from servo valve model 84a. The difference is applied to Kalman gain 83a which then adjusts the states of servo valve model 84a. Servo valve model 84a then tends to adjust its output to match the actual servo valve output. Servo valve model 84a provides the updated states to valve state feedback 85a which then adjusts the new state, sums those gain adjusted new states, and provides an output to summer 86a for comparison with the output from summer 86a.

In this preferred embodiment, the actuator variable state feedback is also generated and provides an input for the servo valve model 84a. The output from accelerometer 56 provides an input to summer 91 which also receives the output from actuator model 84b. The difference from summer 91 is applied to Kalman gain 83b which adjusts the states of actuator model 84b. The input to actuator model 84b comes from demodulator 61a, which is the servo valve output. Actuator state feedback 85b gain adjusts the new states from actuator model 84b. The output from actuator state feedback 85b is adjusted by an RMA gain word and multiplying digital/analog converter with the converted output applied to summer 86b with the desired output signal, the difference then being applied to summer 86a.

In this manner, there is instantaneous control of the servo valve and the actuator within the major feedback loop shown in FIG. 5. That is, for any change in the servo valve output or in the actuator output, instantaneous adjustments are made to keep those outputs within predetermined limits.

Those skilled in the art may employ measuring devices that are different from those disclosed as well as logic networks that are different and different component choices, all without departing from the spirit and scope of this invention which is limited only by the appended claims.

What is claimed is:

1. A seismic source vibrator, including means for providing a desired output signal, comprising:
   (a) at least one pad for imparting acoustic energy into the earth;
   (b) hydraulic system means, including valve means for selectively introducing pressurized hydraulic fluid into the hydraulic system means, to cause the application of reciprocating forces to the pad;
   (c) valve sensor means, connected to the valve means, for sensing the status of the valve means and for providing an electrical valve indicia signal representative thereof;
   (d) valve model means, structured to simulate the valve means and having n states accessible, the valve model means having an input, and an output for providing an estimated output signal;
   (e) valve comparison means for comparing the valve indicia signal with the estimated output signal and for providing a resultant valve error signal;
   (f) valve model gain adjusting means, connected to receive the valve error signal and to adjust the n states in a known ratio in dependence on the instantaneous amplitude of the valve error signal, to cause the estimated output signal to approach the valve indicia signal in instantaneous amplitude;
   (g) valve state feedback means connected to receive the adjusted n states plus inaccessible state (n+) and the valve indicia signal, to weight each n and n+ state in a known ratio and to sum the weighted states; and
   (h) input comparison means for receiving and comparing the weighted sum and the desired output signal for providing a difference signal therefrom, and for applying the difference signal to the input of the valve means and to the input of the valve model means to cause the estimated output signal to approach the desired output signal in instantaneous amplitude, thereby providing self tuning control.

2. The vibrator of claim 1 wherein n=6.

3. The vibrator of claim 2 wherein the valve model means is represented by the Laplace transfer function:

$$\frac{K(W1)^2(W2)^2 \cdot W3}{S(S^2 + 2 \cdot Z1 \cdot W1 \cdot S + W1^2)(S^2 + 2 \cdot Z2 \cdot W2 \cdot S + W2^2)(S + W3)} \quad (1)$$

where:
W1 = 470×2 pi radians/sec.
W2 = 750×2 pi radians/sec
W3 = 400×2 pi radians/sec.
Z1 = 0.08
Z2 = 0.40
S = Laplace transform operator
K = constant.

4. The vibrator of claim 3 wherein the valve model gain adjusting means comprises a Kalman gain network.

5. The vibrator of claim 4 wherein the valve means comprises a slideable spool member to open and close for selectively permitting pressurized hydraulic fluid into the hydraulic system means, wherein the valve sensor means comprises a linear variable-differential transducer, the spool member being coupled to the transducer and wherein the valve indicia signal represents the position of the spool member.

6. A seismic source vibrator, including means for providing a desired output signal, comprising:
   (a) at least one pad for imparting acoustic energy into the earth;
   (b) hydraulic system means including valve means for selectively introducing pressurized hydraulic fluid into the hydraulic system means and actuator means to cause the application of reciprocating forces to the pad;
   (c) valve sensor means, connected to the valve means, for sensing the status of the valve means and for providing an electrical valve indicia signal representative thereof;
   (d) actuator force sensor means, for sensing the actuator force and for providing an electrical actuator signal representative thereof;
   (e) actuator model means, structured to simulate the actuator, having m states accessible, the actuator model means having an input for receiving the valve indicia signal and an output for providing an estimated force signal;
   (f) actuator comparison means for comparing the estimated force signal with the actuator force indicia signal and for providing a resultant actuator error signal;
   (g) actuator model gain adjusting means, connected to receive the actuator error signal and to adjust the m states in a known ratio, in dependence on the instantaneous amplitude of the actuator error signal, to cause the estimated force signal to approach the actuator force indicia signal in instantaneous amplitude;

(h) actuator state feedback means connected to receive the adjusted m states plus inaccessible states (m+), and the actuator force indicia signal, to weight each m and m+ state in a known ratio, and to sum the weighted states; and (j) force comparison means for receiving and comparing the weighted sum and the valve indicia signal for providing a difference signal therefrom and for applying the difference signal to the input of the valve means and to the input of the actuator model means to cause the estimated force signal to approach the valve indicia signal in amplitude, thereby providing self tuning control.

7. The vibrator of claim 6 wherein m=2.

8. The vibrator of claim 7 wherein the actuator model means is represented by the Laplace transform function, $$\frac{K \times S}{S^2 + 2Z1 \times W1 \times S + W1^2}$$

wherein:
W1 = 22×2 pi radians/sec.
Z1 = 0.20
S = Laplace transform operator
K = constant.

9. The vibrator of claim 8 wherein the actuator model gain adjusting means comprises a Kalman gain network.

10. The vibrator of claim 9 wherein the valve means comprises a slideable spool member to open and close for selectively permitting pressurized hydraulic fluid into the hydraulic system means, the valve sensor means comprises a linear variable-differential transducer, the spool being coupled to the transducer, the valve indicia signal representing the position of the spool.

11. The vibrator of claim 10 wherein the actuator force sensor means comprises an accelerometer attached to the actuator means.

12. A seismic source vibrator, including means for providing a desired output signal, comprising:

(a) at least one pad for imparting acoustic energy into the earth;

(b) hydraulic system means, including valve means for selectively introducing pressurized hydraulic fluid into the hydraulic system means and actuator means, to cause the application of reciprocating forces to the pad;

(c) valve sensor means, connected to the valve means, for sensing the status of the valve means and for providing an electrical valve indicia signal representative thereof;

(d) valve model means, structured to simulate the valve means and having n states accessible, the valve model means having an input, and an output for providing an estimated output signal;

(e) valve comparison means for comparing the valve indicia signal with the estimated output signal and for providing a resultant valve error signal;

(f) valve model gain adjusting means, connected to receive the valve error signal and to adjust the n states in a known ratio in dependence on the amplitude of the valve error signal, to cause the estimated output signal to approach the valve indicia signal in amplitude;

(g) valve state feedback means connected to receive in a known ratio in dependence on the amplitude of the valve error signal, to cause the estimated output signal to approach the valve indicia signal in amplitude;

(g) valve state feedback means connected to receive the adjusted n states plus inaccessible states (n+) and the valve indicia signal, to weight each n and n+ state in a known ratio, and to sum the weighted n and n+ states;

(h) actuator force sensor means for sensing the actuator force and for providing an electrical actuator force indicia signal representative thereof;

(j) actuator model means, structured to simulate the actuator, having m states accessible, and having an input for receiving the estimated output signal and an output for providing an estimated force signal;

(k) actuator comparison means for comparing the estimated force signal with the actuator force indicia signal and for providing a resultant actuator error signal;

(l) actuator model gain adjusting means, connected to receive the actuator error signal and to adjust the m states in a known ratio, in dependence on the amplitude of the actuator error signal, to cause the estimated force signal to approach the estimated output signal in amplitude;

(m) actuator feedback means connected to receive the adjusted m states plus inaccessible states (m+), including the actuator force indicia signal, to weight each m and m+ state in a known ratio, and to sum the weighted m and m+ states; and (n) input comparison means for receiving and comparing the m and m+ sum, the n and n+ sum and the desired output signal to provide a difference signal therefrom, and for applying the difference signal to the input of the valve means and to the input of the valve model means to cause the estimated output signal to approach the desired output signal in instantaneous amplitude, thereby providing self tuning control.

13. The vibrator of claim 12 wherein m=2.

14. The vibrator of claim 13 wherein the valve model means is represented by the Laplace transfer function:

$$\frac{K(W1)^2(W2)^2 \cdot W3}{S(S^2 + 2 \cdot Z1 \cdot W1 \cdot S + W1^2)(S^2 + 2 \cdot Z2 \cdot W2 \cdot S + W2^2)(S + W3)} \quad (1)$$

where:
W1 = 470×2 pi radians/sec.
W2 = 750×2 pi radians/sec
W3 = 400×2 pi radians/sec.
Z1 = 0.08
Z2 = 0.40
S = Laplace transform operator
K = constant.

15. The vibrator of claim 14 wherein the valve model gain adjusting means comprises a Kalman network.

16. The vibrator of claim 15 wherein the valve means comprises a slideable spool member to open and close for selectively permitting pressurized hydraulic fluid into the hydraulic system means, the valve sensor means comprises a linear variable-differential transducer, the spool member being coupled to the transducer, the valve indicia signal representing the position of the spool member.

17. The vibrator of claim 12 wherein m=2:

18. The vibrator of claim 13 wherein the actuator model means is represented by the Laplace transform function:

$$\frac{K \times S}{S2 + 2Z1 \times W1 \times S + W1^2}$$

wherein:
W1 = 22 × 2 pi radians/sec.
Z1 = 0.20
S = Laplace transform operator
K = constant.

19. The vibrator of claim 14 wherein the actuator model gain adjusting means comprises a Kalman gain network.

20. The vibrator of claim 15 wherein the actuator force sensor means comprises an acceleromter attached to the actuator means.

21. A seismic source vibrator, including means for providing a desired output signal, comprising:
 (a) at least one pad for imparting acoustic energy into the earth;
 (b) hydraulic system means, including valve means for selectively introducing pressurized hydraulic fluid into the hydraulic system means and actuator means, to cause the application of reciprocating forces to the pad;
 (c) sensor means, for sensing the actuator force and for providing an electrical actuator force indicia signal representative thereof;
 (d) model means, structured to simulate the valve means and the actuator means and having n states accessible, the model means having an input and an output for providing an estimated output signal;
 (e) comparison means for comparing the actuator force indicia signal with the estimated output signal and for providing a resultant error signal;
 (f) model gain adjusting means, connected to receive the error signal and to adjust the n states in a known ratio in dependence on the amplitude of the valve error signal, to cause the estimated output signal to approach the valve indicia signal in amplitude;
 (g) state feedback means connected to receive the adjusted n states plus inaccessible states (n+) and the actuator force indicia signal to weight each n and n+ state in a known ratio, and to sum the weighted states; and
 (h) input comparison means for receiving and comparing the sum and the desired output signal to provide a difference signal therefrom, and for applying the difference signal to the input of the valve means and to the input of the model means to cause the estimated output signal to approach the desired output signal in instantaneous amplitude, thereby providing self tuning control.

22. The vibrator of claim 21 wherein n = 8.

23. The vibrator of claim 22 wherein the model means comprises a Kalman gain network.

24. The vibrator of claim 23 wherein the senior means comprises an accelerometer attached to the actuator means.

* * * * *

UNITED STATES PATENT AND TRADEMARK OFFICE
CERTIFICATE OF CORRECTION

PATENT NO. : 4,637,002

DATED : January 13, 1987

INVENTOR(S) : John J. Sallas

It is certified that error appears in the above-identified patent and that said Letters Patent is hereby corrected as shown below:

Column 3, line 35; change "System" to --Service--.

Column 3, lines 57 and 64; change "Systems" to --Service--.

Signed and Sealed this

Tenth Day of May, 1988

Attest:

DONALD J. QUIGG

*Attesting Officer*   Commissioner of Patents and Trademarks